Figure 11:
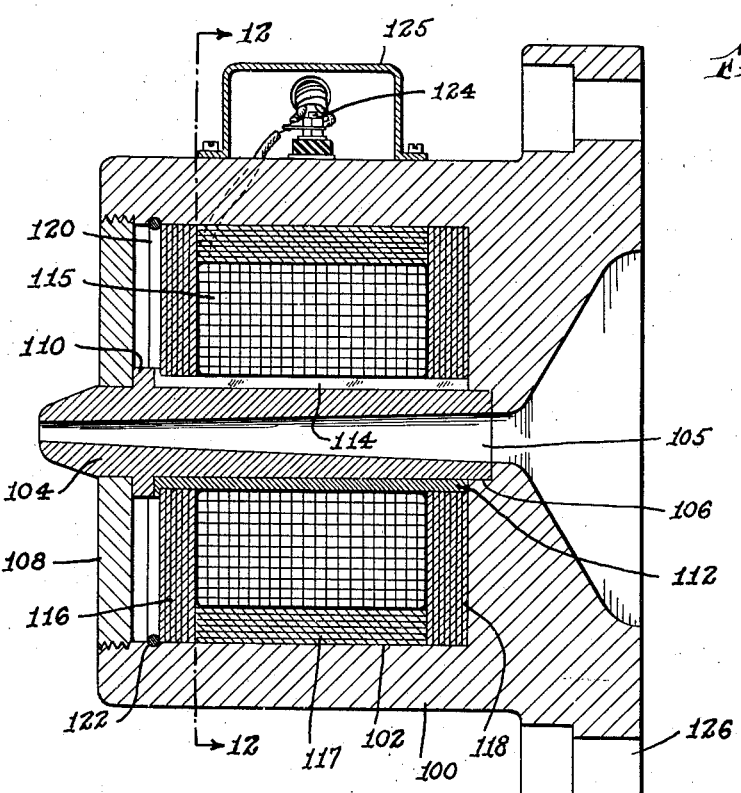

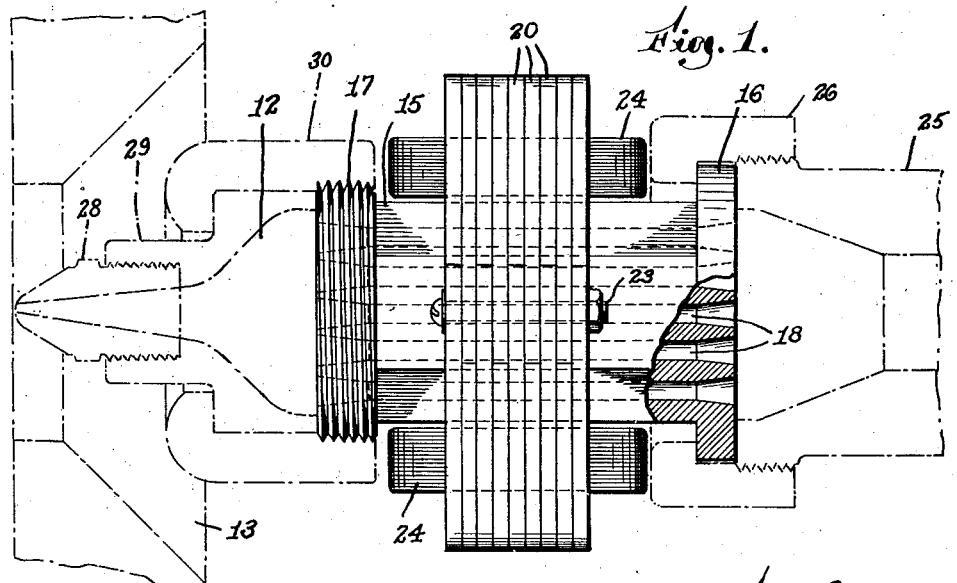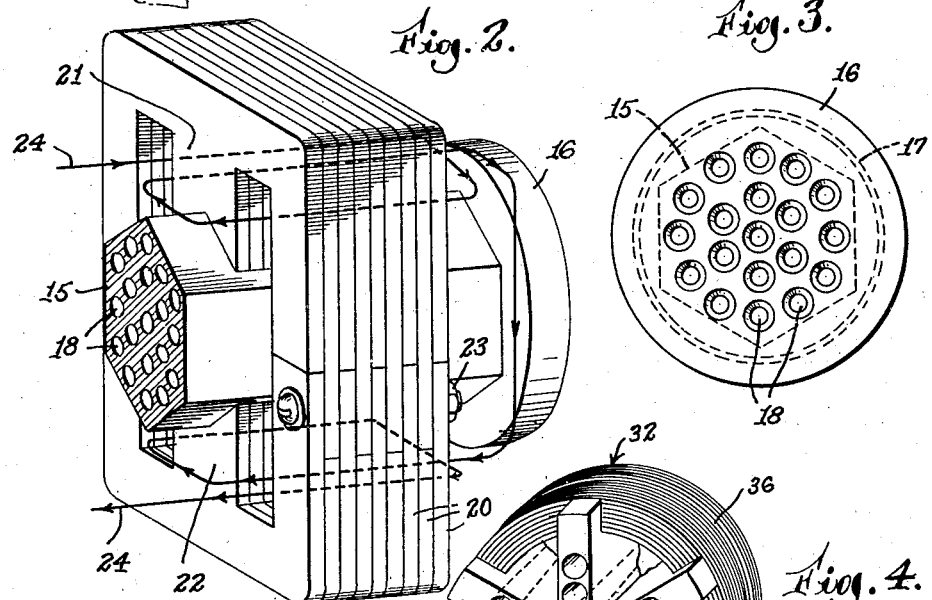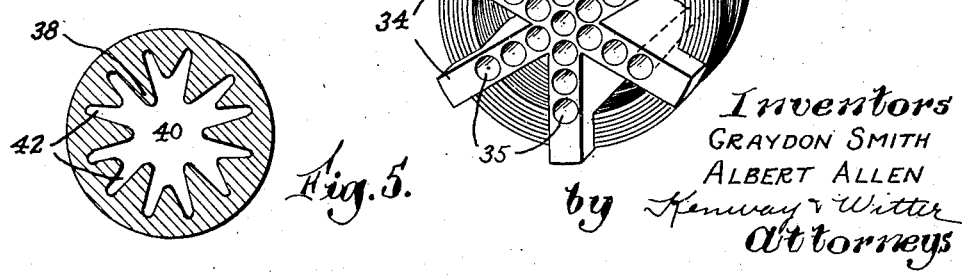

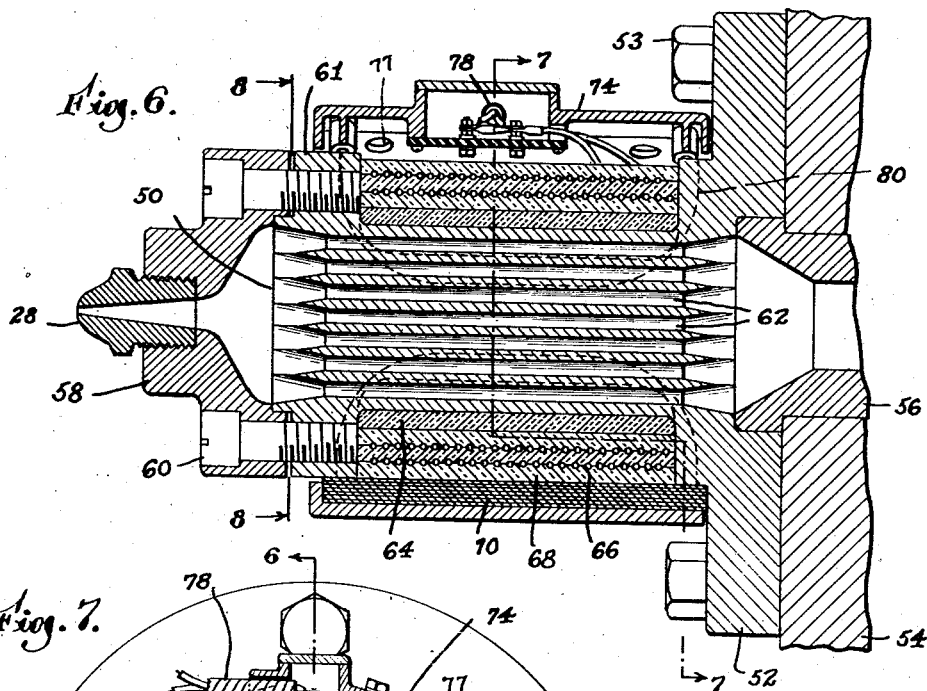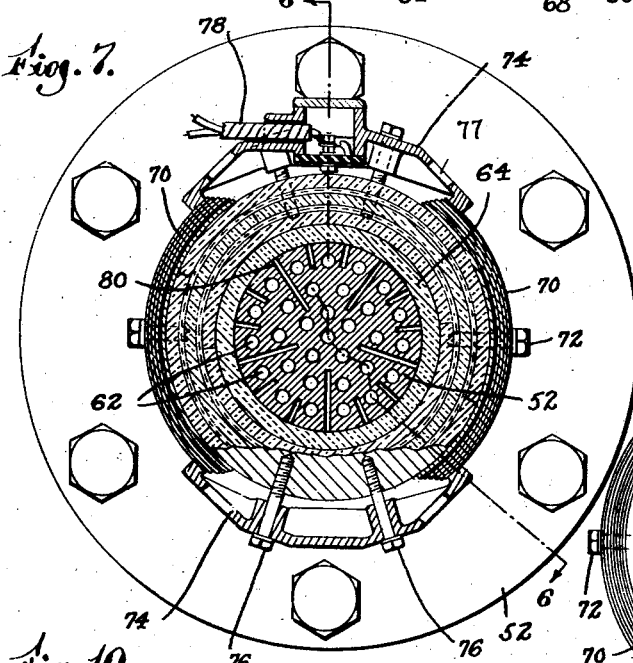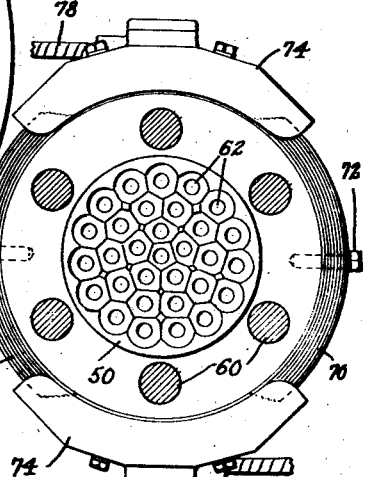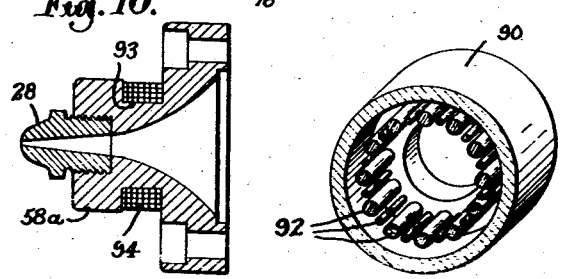

Dec. 24, 1940.  G. SMITH ET AL  2,226,446
PROCESS FOR TREATING THERMOPLASTIC PRODUCTS
Filed Dec. 23, 1937  3 Sheets-Sheet 3

Inventors
GRAYDON SMITH
ALBERT ALLEN
by Kenway & Witter
Attorneys

UNITED STATES PATENT OFFICE 2,226,446

PROCESS FOR TREATING THERMOPLASTIC PRODUCTS

Graydon Smith, Cambridge, and Albert Allen, Sharon, Mass., assignors, by mesne assignments, to Reed-Prentice Corporation, Worcester, Mass., a corporation of Massachusetts Application December 23, 1937, Serial No. 181,250

3 Claims. (Cl. 219—47)

This invention relates to the treatment of any material which requires heat in molding, as, for example, wax, Celluloid, cellulose acetate, phenol-condensate products in general, and various other thermo-plastic materials. Such material is usually supplied to the manufacturer in granular form, such as dry powder or pellets, and in manufacturing molded articles this material is forced under high pressure through an orifice into a mold cavity and is heated to a plastic condition in the passage. The material is inherently a poor conductor of heat, being therefore difficult to heat uniformly, and it is likely to become burnt or discolored if overheated. The problem of uniformly heating a mass of this material under very high pressure and maintaining it always within the required range of temperature presents great practical difficulties.

One of the best processes heretofore known for heating and delivering a thermoplastic product under pressure has been to force the molding material through a heated cylinder having therein a solid core, or pineapple as it is commonly called, suspended from the internal walls of the cylinder and effective to spread the charge into annular form so that the effective heating surface is thereby increased. It is difficult however with such apparatus to secure uniform and adequate heating of the entire mass and the closest vigilance and skillful regulation is required to obtain passable results.

We have discovered a greatly improved process of handling thermoplastic products whereby we are enabled to secure close and accurate regulation of temperature and substantially uniform distribution of heat throughout the product by the employment of a more compact and convenient apparatus than has been heretofore available.

In one aspect our invention comprises a novel process characterized by passing granular thermoplastic material through one or more passages providing a substantial surface heating contact for the material in a ferro-magnetic member located in the magnetic field of an alternating current system and thus adapted to be heated by core losses, that is to say, by hysteresis and to some extent by induced eddy currents.

In another aspect our invention consists in novel apparatus herein shown as adapted for carrying out the process of the invention. This apparatus may comprise an elongated body of magnetic metal of suitable cross section containing a multiplicity of longitudinal passages for the thermoplastic material, the body being located as the core of an electro-magnetic system and interposed between the mold and the pressure-generating element of the system. Such apparatus as compared with that heretofore known is much more compact and convenient in its dimensions, presents a greater volume of material more effectively distributed for heating, and provides a substantially larger cross-sectional passage and surface heating area for the product.

The elongated body may take any convenient shape for incorporation in the complete system so long as it is of magnetic metal and is provided with a longitudinal passage or passages providing a considerable heating surface for the molding product. It may be located as the core of an electro-magnet or it may be shaped to carry windings so that it becomes itself an electromagnet. In any case the effect of an alternating magnetic field upon the body is to heat it by internally developed heat and maintain it at a substantially uniform temperature which may be readily adjusted and held well within the temperature limits suited for the product passed through it. In order to avoid burning the plastic material, as commonly occurs from uneven heating, it is important to make the heating effect from hysteresis large as compared to the heating effect from eddy currents developed in the body of the conduit. Eddy currents tend to concentrate their heating effect on its outside surface, while the heating effect of hysteresis tends to be uniform throughout the mass of the body. Accordingly we find it very desirable to select a magnetic metal which exhibits a high hysteresis loss when subjected to an alternating magnetic field and to reduce eddy currents by selecting material which also has high specific resistance. Resistance to eddy currents is also effected by the geometry of the conduit body, and properly placed non-magnetic gaps in the body, such as slots, are very effective in reducing eddy currents by increasing the length of the path through which they must flow. In the apparatus of our invention, accordingly, the heating effect due to eddy currents is small as compared to the heating effect due to the hysteresis loss of the magnetic metal of the conduit body.

Figure 12:
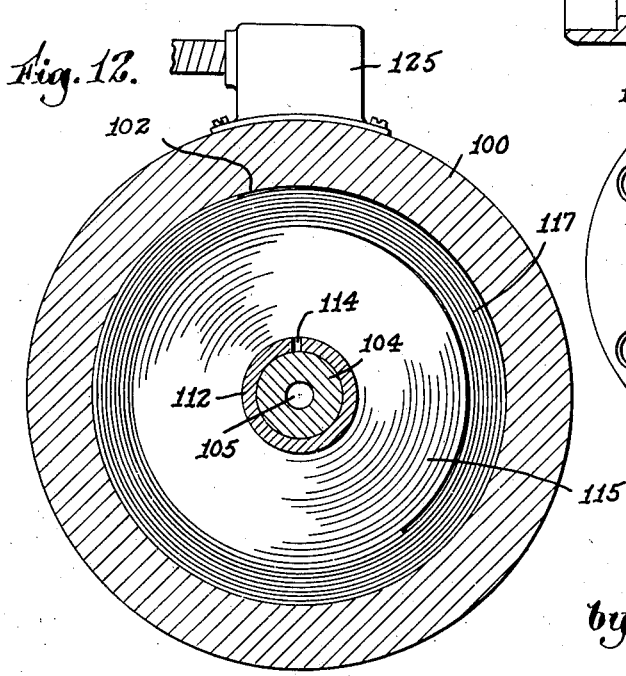
Figure 13:
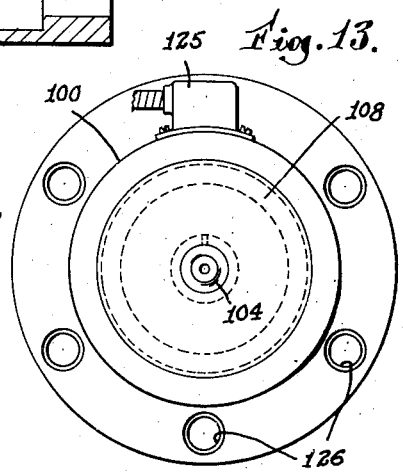

These and other features of the invention will be best understood and appreciated from the following description of several forms of apparatus illustrated in the accompanying drawings and adapted to carry out our invention, in which Fig. 1 illustrates in side elevation one embodiment of an apparatus for carrying out our invention, a portion thereof being broken away and cooperating parts being shown in broken lines, Fig. 2 is a perspective view of the apparatus, the front end portion thereof being illustrated as broken away, Fig. 3 is a rear end elevation thereof, Fig. 4 is a fragmentary perspective rear end view of a modified form of the invention, Fig. 5 is a cross-sectional view through another form of apparatus, Fig. 6 is a longitudinal sectional view of a further and preferred modified form of apparatus, Figs. 7 and 8 are cross-sectional views taken respectively on lines 7—7 and 8—8 of Fig. 6, Fig. 9 is a cross-sectional perspective view of a further modified form of the invention, Fig. 10 is a longitudinal sectional view of a nozzle structure employing our invention, Fig. 11 is a longitudinal sectional view of a preferred nozzle structure employing our invention, Fig. 12 is a sectional view taken on line 12—12 of Fig. 11, and Fig. 13 is a front end view of Fig. 11.

Whereas devices heretofore employed for heating molding material in or preparatory to molding the same have depended upon the conduction of heat from the outside, the basic feature or process of our invention resides in generating heat for the molding process within the metallic body of the device. In accordance with the invention, the heat is generated by an alternating electro-magnetic field within which the metallic conduit body is located, a passage or a plurality of independent or interconnected passages being formed through the conduit body for receiving the molding material in a manner providing a substantial surface heating area for the contact by the material. Such construction provides a streamlined and unobstructed passage for the material and the large surface heating area serves very effectively to transfer heat to the material uniformly during its passage through the device. The device may be constructed in various forms to carry out the object of the invention, several proposed forms being illustrated in the accompanying drawings.

Referring first to the form of invention illustrated in Figs. 1–3, 15 indicates an elongated conduit body of magnetic metal provided with a plurality of longitudinal passages 18 therethrough from end to end. The body may be of any suitable shape, illustrated in the drawings as hexagonal, and may have annular shoulders 16 and 17 integral therewith respectively and projecting transversely at its rear and front ends, these shoulders adapting the body for connection to cooperating mechanism. The passages 18 are streamlined and are illustrated as being of uniform diameter throughout the body 15 between the shoulders 16 and 17 but preferably enlarged or flared outwardly at both ends thereof. Mounted on the body 15 are laminated field core pieces 20 held together by bolts 23 and having opposed inwardly directed poles 21 and 22, the ends of the poles being V-recessed and in contact with opposed corners of the hexagonal body. Field coils 24 are wound about the poles as illustrated and when the coils are energized by an alternating electric current magnetism as induced in the two closed magnetic circuits provided by the two sides of the laminated core and the body of the magnetic conduit 15.

A tubular member 25 is connected to the rear end of the body 15, a flanged sleeve 26 threaded to the member and overlapping the shoulder 16 serving to provide the connection. To the forward end of the body is connected a nozzle head 12 comprising a nozzle piece 28, a bushing 29 and a retaining sleeve 30, the sleeve being threaded to the annular flange 17 of the body 15. The tubular member 25 together with the body 15 and nozzle head are movable longitudinally into cooperating engagement with a molding die-holding block or platen 13. A plunger operable within the member 25 in well known manner is adapted to force the molding material into and through the passages 18 of the body member. This material is ordinarily of granular form, ranging from a powder to pellets of substantial size, and a very considerable pressure is required to force the same through the heating unit.

It will be apparent that the passing of an alternating current through the coils 24 sets up an alternating electro-magnetic field in the body 15. Furthermore, the alternating electro-magnetic field thus induced causes heating of this body due to core losses, that is chiefly by hysteresis and partly by induced eddy currents, this heat being generated within the body 15 and being substantially uniform therethrough. It is of considerable importance that the shoulder or header 16 of the body is heated since such heating substantially reduces the very great pressure required to force the solid material into and through the body, it being apparent that heating of the material as it is jammed against the header causes a softening of the material whereby making it easier for it to enter the passages 18. The passage of the material is further facilitated by the enlarged ends of the passages 18 at the header ends thereof and by the unobstructed streamlined course of the passages. Thus, as the material is forced through the conduit body 15 its contact with a substantial surface area of the body renders the material uniformly plastic and the heating thereof can be so controlled as most efficiently to serve the purpose of the invention.

The body 15 may be made in any desirable and suitable shape or form, as will be readily understood, and in Fig. 4 we have illustrated a modified construction thereof. This body 32 comprises a central body portion and a plurality of vanes or ribs 34 radiating therefrom and providing gaps therebetween. The body portion and vanes have passages 35 extending longitudinally therethrough and these passages are illustrated as converging forwardly to compact the material as it moves through the device, it being understood that such construction may be desirable in some cases and with some materials. Heat is generated within this body by electro-magnetic forces induced by current passed through a coil or coils 36 wound about the vanes 34.

As described above, the molding material is heated during its passage through the device by its contact with the walls of the passages and, while we have illustrated and may prefer to employ a plurality of independent passages 18 or 35, we desire to emphasize the fact that the device requires a substantial heating area of surface contact for the material as the material passes through the device, and this surface contact may be provided by one or more passages as may seem desirable and efficient. For example, in Fig. 5 we have illustrated a body 38 having a passage 40 longitudinally therethrough and having an outline providing a very substantial surface contact for the material as it passes through the device. Furthermore, this form may be considered as employing a main central passage 40 and a plurality of outer passages 42 in communication with the central passage, the important requirement being to provide a substantial surface contact for the material as it passes longitudinally through the device.

The preferred form of the invention which we have so far devised is illustrated in Figs. 6–8 of the drawings, it being understood however that the details thereof may be considerably modified. This device employs a conduit body 50 of magnetic metal having a large annular flange 52 at its rear end secured by tap bolts 53 to a member 54 carrying a tubular member 56, a forcing piston for the molding material operating within the member 56. A nozzle head 58 is secured by tap bolts 60 to the flange 61 on a front end of the body 50. Passages 62, similar to the passages 18, are formed through the body. On the intermediate portion of the body, between the enlarged ends of the passages is wound asbestos insulation providing a heat insulating sleeve 64. This asbestos sleeve is located between the annular flanges 52 and 61 and surrounding this sleeve between the flanges are one or more field coils 66. These coils may be left fully exposed or may be partly or fully housed. We have illustrated the coils as housed between sectional sleeves 68 of porcelain or other suitable insulation.

Two laminated units 70 are mounted transversely or circumferentially on the outer sleeve 68 at opposite sides of the body 50, each unit comprising a stack of steel plates preferably secured together by rivets or otherwise into a unit. The intermediate portion of each unit is secured to the body by two bolts 72 threaded into the flanged ends 52 and 61 of the body and the lateral ends of the units are engaged beneath aluminum covers 74 secured to the body by tap bolts 76, the covers filling the oppositely disposed gaps between the laminated units 70. Each cover 74 is held to the body by four tap bolts 76 threaded into the flanges 52 and 61. The covers are hollow and formed with holes 77 permitting a free circulation of cooling air to the coils 66 and units 70, and the top cover (Fig. 7) provides a supporting outlet for the terminals 78 of the coils. The covers serve to hold the laminated units 70 in the position illustrated and prevent vibration thereof. It will be understood that these units serve to complete the magnetic circuit in which the conduit body 50 is included, that is, each laminated unit 70 contacts with the conduit body at its end flanges and bridges the intermediate space where the coils 66 are located. Thus each unit completes a closed magnetic circuit of which the conduit body is a common element and thus the magnetic flux in the conduit body is increased and the hysteresis effect intensified.

The operation of this form of the invention is generally the same as has been above described in reference to Figs. 1–3. The passing of an alternating current through the coil 66 develops an alternating magnetic field within the body 50, whereupon the body is heated uniformly throughout by the resulting core losses, principally hysteresis. The body is furthermore radially slotted at 80 between the passages 62 for the purpose of breaking up and somewhat reducing the flow of eddy currents throughout the body 50, thereby obtaining a more uniform distribution of the core losses with even heating of the body 50 and also the thermoplastic material in the passages 62.

In Fig. 9, we have illustrated a further modified form of our invention wherein the passage through the body 90 is broken up by a plurality of rods 92 secured at their ends to the end walls of the body and extending longitudinally through the passage. These rods provide a substantial heating surface for contact with the material as it is forced through the passage.

In Fig. 10 there is shown an arrangement for heating the nozzle 28 so that there will be no appreciable cooling of the plastic material as it flows through the nozzle opening into the die. For this purpose, the nozzle head 58a is composed of ferro-magnetic material and has a reduced portion 93 surrounded by a coil 94. Upon energization of the coil 94 by alternating current, the head 58a and nozzle 28 will be heated by core losses. Since the head 58a and the nozzle 28 provide but a single central passage for the plastic material, this heating is sufficient to prevent any appreciable cooling of the material before it enters the die. While we have herein illustrated the heating unit as comprising a coil without laminated units, such as the units 70 of Fig. 6, for completing the magnetic path, it should be understood that ordinarily the employment of such units is desirable since they serve to give greater heating efficiency, it being understood that both the main body and nozzle or either may be constructed with or without units for completing the magnetic path.

In Figs. 11, 12 and 13 we have illustrated a preferred nozzle structure comprising a head 100 having its forward end chambered at 102. Mounted axially within the chamber is a relatively long nozzle 104, the nozzle and head having a passage 105 therethrough. The rear end of the nozzle is seated in a countersink 106 in the head and the nozzle is held in place by a plate 108 threaded into the forward end of the chamber and in engagement with an annular flange 110 on the nozzle.

Surrounding the nozzle is a brass sleeve 112 slotted longitudinally at 114 to prevent eddy currents. The purpose of the invention is to heat the nozzle and walls of the passage 105 and to this end a coil 115 is provided within the chamber 102 and about the nozzle, the coil preferably surrounding the sleeve and nozzle as illustrated. We also preferably provide laminated steel units 116, 117 and 118 about the coil to facilitate the flow of magnetic flux through the nozzle. The unit 117 may comprise a metal ribbon wound spirally about the coil and the units 118 and 116 may be metal discs covering the ends of the coil. A split wire ring 120 is arranged to snap into an annular groove 122 to hold the discs in place. The coil terminals pass outwardly to supporting studs 124 within a box 125 on the head 100.

The object of the invention is to keep the walls of the passage 105 heated while the plastic composition is being forced therethrough and the arrangement of the coil and laminated units thereabout within the chamber 102 is adapted to provide such heating with greater efficiency. It will furthermore be noted that the construction permits removal of the nozzle 104 upon removing the threaded plate 108, all without disturbing the coil and its terminals within the box 125. Also the laminated units and coil may be conveniently removed upon removing the split ring 120. The head 100 may be secured to the main unit shown in Fig. 6 by extending tap bolts 60 through the tap bolt holes 126.

In the foregoing description, and in the following claims, the term "ferro-magnetic material" is used in its broadest sense, to indicate any metal or alloy having marked magnetic properties and customarily used in the manufacture of electrical apparatus. The particular ferro-magnetic material utilized for the bodies 15, 38, 50, 58a and 100 is chosen for the relatively high hysteresis loss which it exhibits when subjected to an alternating magnetic field. We desire furthermore to state that, while in describing our invention herein we have more specifically referred to an alternating flux, a heating effect will be produced by any varying magnetic flux and a pulsating unidirectional flux or random changes would be effected in producing the heating results described. It is therefore to be understood that the broad concept of the invention includes any magnetic field which will produce the required heat. While we have also herein more specifically referred to the heating of thermoplastic and granular materials, it is apparent that the invention is applicable to the heating of any form of molding material capable of being rendered plastic by heat and the term "thermoplastic" is accordingly used herein in that broad sense. Furthermore, we desire it to be understood that distribution of the core losses will not be entirely uniform and that in this respect the term "uniform" is intended to be construed as meaning substantially uniform. The novel apparatus herein disclosed is not claimed herein but forms the subject matter of our copending application, Ser. No. 258,494, filed February 25, 1939.

Having thus described our invention, what we claim as new and desire to secure by Letters Patent of the United States is:

1. The process of preparing thermoplastic material for molding which consists in advancing it in a narrow stream through a conduit while uniformly heating the walls of the conduit by hysteresis induced by a varying electro-magnetic field, and preventing the uneven surface heating of the material during the process by limiting the formation of eddy current at and about the walls of the conduit.

2. The process of preparing thermoplastic material for molding which consists in dividing the material into a plurality of narrow streams and thus forcing it through a plurality of conduits while uniformly heating the walls of the conduits by hysteresis induced by a varying electro-magnetic field, and preventing uneven surface heating of the material during the process by limiting the formation of eddy currents about and between the conduits.

3. The process of preparing thermoplastic or the like material for molding which consists in advancing it in a stream through a conduit with walls shaped to make extensive surface contact with the material, while uniformly heating the said walls of the conduit by hysteresis induced by a varying electro-magnetic field, and preventing uneven surface heating of the material during its passage through the conduit by limiting the formation of eddy currents at or about the walls of the conduit.

GRAYDON SMITH.
ALBERT ALLEN.